United States Patent

Constantine

[15] 3,655,474
[45] Apr. 11, 1972

[54] METHOD OF PRODUCING SHRINK-STABILIZED COMPOSITE FABRICS

[72] Inventor: Thomas T. Constantine, South Easton, Mass.

[73] Assignee: Fabric Research Laboratories, Dedham, Mass.

[22] Filed: Sept. 19, 1969

[21] Appl. No.: 859,452

[52] U.S. Cl............................156/178, 156/183, 156/196, 156/148, 156/281, 156/324
[51] Int. Cl............................................................B32b 5/00
[58] Field of Search....................156/84, 148, 185, 196, 281, 156/161, 164, 178, 183, 324; 26/18.6

[56] References Cited

UNITED STATES PATENTS 3,424,833   1/1969   Mazzolini et al...................156/161 X

*Primary Examiner*—Carl D. Quarforth
*Assistant Examiner*—Stephen J. Lechert, Jr.
*Attorney*—Mandeville and Schweitzer

[57] ABSTRACT

The disclosure relates to the shrink-stabilization of laminated and bonded fabrics, herein referred to as composite fabrics, by mechanical compressive shrinkage techniques adapted especially to handle the composite material. The disclosure also relates in part to a new product, in the form of a shrink-stabilized composite fabric. In the disclosed process, a mechanically settable thermoplastic tricot backing fabric is bonded to a desired outer or shell fabric to form the composite. The composite is mechanically compressively shrunk in a two roll compactor, including a feeding roll and a retarding roll. The composite fabric is so oriented relative to the compacting apparatus that the tricot backing fabric contacts the retarding roll, and the relationship of peripheral speeds of the feeding and retarding rolls is such as to effect longitudinal upsetting of the knitted loops of the backing material, confined wholly within the lengths of the loops to avoid pleating of the fabric. The mechanical compressive shrinkage operation is so carried out that the settable backing fabric material is semi-permanently set in an upset condition, at least partly by reason of self-generated heat of formation, resulting from the mechanical compacting operation. The new product, in addition to having a desirable stabilization against excess shrinkage, has a noticeably improved hand, as compared to the same material prior to processing, rendering the processed composite fabric more attractive for many applications, particularly garments.

13 Claims, 12 Drawing Figures

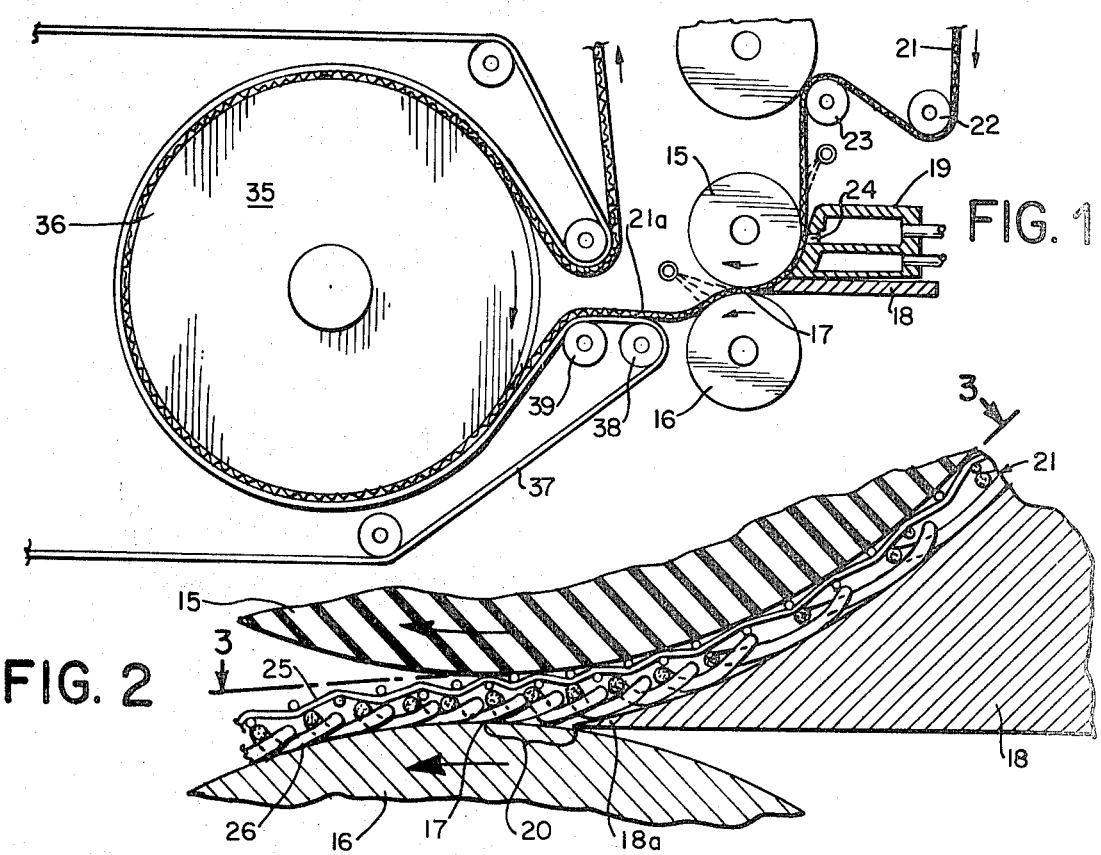
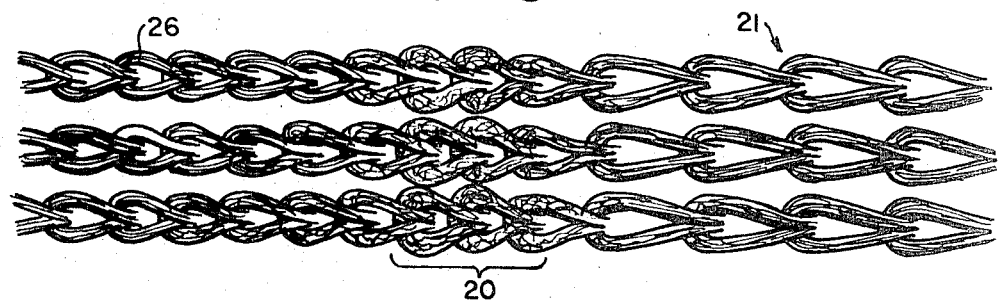
INVENTOR
THOMAS T. CONSTANTINE
BY Mandeville & Schweitzer
ATTORNEYS

INVENTOR.
THOMAS T. CONSTANTINE

METHOD OF PRODUCING SHRINK-STABILIZED COMPOSITE FABRICS

BACKGROUND OF INVENTION

To a substantial and increasing extent, garment manufacturers are utilizing so-called laminated and bonded fabrics in the construction of garments and other items, particularly for outer wear. Bonded and laminated fabrics typically incorporate a desired outer fabric layer, referred to herein as a shell fabric, and a suitable inner layer, referred to herein as a backing fabric. In a so-called bonded fabric, the shell fabric and backing fabric are adhesively secured together by a suitable bonding resin, which is applied over the surface of one of the fabrics and serves to bond the two fabric layers in substantially full area contact. In the case of laminated fabrics, the shell fabric and backing fabric are bonded by an intermediate material, typically a polyurethane foam or similar material. During the laminating process, sufficient heat typically is applied to the intermediate foam layer as to cause a partial collapse thereof, along with a melt bonding to the shell and backing fabrics. In a properly constructed laminated fabric, the intermediate foam lamination is barely detectable. In most cases, however, the retained presence of the foam intermediate provides a desirable increase in the thickness and body of the fabric, which is desirable for many applications.

For the purpose of the present specification and claims, bonded and laminated fabrics will be referred to generically, for convenience, as composite fabrics.

Although composite fabrics have many desirable applications to the manufacture of garments, particularly outerwear, experience has shown that such fabrics in their as-manufactured form, are subject to excessive shrinkage (e.g., typically around 8 percent) when subjected to conventional laundering and dry cleaning processes. Such shrinkage tendencies have severely curtailed the widespread utilization of composite fabrics.

SUMMARY OF INVENTION

In accordance with the invention, a technique is provided for effecting the shrink stabilization of composite fabrics to a level acceptable to garment manufacturers and merchandisers. At the present time, a residual shrinkage of 3 percent or less, when subjected to up to five home launderings, is acceptable to manufacturers and retailers at many levels, at least as regards composite fabrics for outerwear.

In the process of the invention, composite fabrics are subjected, after laminating or bonding, to a controlled mechanical compressive shrinkage procedure, which is conducted in a manner to retain or even improve upon the appearance of the fabric viewed from the shell fabric side and without detrimentally affecting the fabric as by pleating. To particular advantage, the process of the invention can utilize the subject matter of the prior U.S. Pats. of Richard R. Walton, Nos. 2,765,513 and 2,765,514. The Walton patents referred to are directed to method and apparatus for mechanically compressively shrinking fabrics utilizing a two roll compactor provided with a so-called indentor element or blade. The two rolls of the Walton-type compactor form a roller nip and are driven at differential speeds so that one roll, the faster one, may serve as a feeding roll, and the other roll, the slower one, serves as a retarding roll. The feeding roll is formed with a resilient surface, and the indentor element or shoe is arranged to press incoming fabric against the feeding roll along a line spaced a short distance in advance of the roller nip. The arrangement is such that fabric is fed in substantially positive manner by the feeding roll up to and beyond the discharge edge of the indentor blade, and the fabric is shortly thereafter decelerated to a slower speed by virtue of its engagement with the retarding roll at the roller nip. The fabric thus is caused to compress longitudinally or "compact" in the short compressive shrinking zone formed between the end of the indentor shoe and the roller nip.

In accordance with one aspect of the invention, the backing fabric component of the composite fabric comprises a knitted tricot fabric. The tricot backing fabric is so oriented during the course of the processing, that it contacts the retarding roller of the compacting apparatus, while the shell fabric is maintained in contact with the feeding roller. Moreover, the construction and orientation of the tricot backing fabric advantageously is such that the exposed surface of the tricot consists essentially of longitudinally disposed rows of knitted loops, while the interior or bonded surface of the tricot backing fabric comprises a plurality of diagonally disposed connecting elements. The shell and backing fabrics are bonded together by contact with the diagonally disposed connecting elements of the tricot fabric, and the inherent longitudinal spacing between these connecting elements accommodates the desired compressive shrinkage of the composite fabric. At the same time, the loop structure of the tricot backing fabric, exposed at the back surface of the composite fabric, is caused to be upset in the thickness direction of the composite fabric during the compressive shrinkage operation.

When the composite fabric is oriented and constructed as described in the foregoing paragraph, the necessary compressive shrinkage effort may be imparted to the fabric without causing the fabric either to delaminate or to form pleats.

Desirably, the tricot backing fabric is formed of a mechanically settable thermoplastic material, such as acetate or nylon, and this material is caused to be semi-permanently set during the course of the compressive shrinking operations. As contemplated by the invention, setting of the backing fabric does not require the external heating of the fabric to a heat-setting temperature level. Rather, it appears that heat at a level adequate for effecting permanent deformation of the yarns is self-generated within the material itself by the mechanical working and deformation of the fibers and yarns during the compressive shrinking operation, supplemented, of course, by external heat at a modest level (inadequate for heat setting) by reason of application of steam to the fabric, and possibly also by internal steam heating of one or more rolls contacting the fabric during the compacting and subsequent processing thereof.

The product of the invention is a unique and commercially advantageous shrink-stabilized composite fabric, in which the shell and backing fabrics have been mechanically compressively shrunk, after bonding or laminating, in the absence of delamination or pleating, and in which the loops of the backing fabric are upset in the thickness direction of the composite fabric. Most advantageously, the backing fabric is of a tricot material, oriented with longitudinal rows of knitted loops located on the outside surface of the composite fabric. The individual loops are upset in the thickness direction in such a manner that each loop is generally of a saw-tooth configuration having an obtuse included angle at its apex.

For a complete understanding of the invention, and a further description of the various alternatives and modifications contemplated thereby, reference should be made to the following detailed description, and to the accompanying drawing.

DESCRIPTION OF THE DRAWING

FIG. 1 is a highly simplified, schematic representation of processing equipment suitable for carrying out the process of the invention.

FIG. 2 is a greatly enlarged, fragmentary cross-sectional view of the apparatus of FIG. 1, illustrating particularly the compressive shrinking zone and including a representation of the manner in which the fabric is acted upon during processing.

FIG. 3 is a simplified representation, as taken generally along the cross-sectional line 3–3 of FIG. 2, illustrating in plan view a fabric during various stages of processing according to the invention.

FIG. 4 is a greatly enlarged cross-sectional view of a loop of tricot backing fabric, forming part of a composite fabric process in accordance with the invention, illustrating the configuration of the loop after such processing.

DESCRIPTION OF PREFERRED EMBODIMENT

In the practice of the invention, the composite fabric, which serves as a starting material, includes three essential components. These are the outer or shell fabric, the inner or backing fabric, and the means for bonding these two fabrics together. The invention contemplates the utilization of an extremely wide variety of outer or shell fabrics, selected to have the aesthetic and/or functional characteristics desired by the designer and manufacturer. In general, the shell fabric may be of knitted, woven, or even non-woven construction, and its construction and/or processing prior to forming of the composite is such that the fabric contains residual length-wise shrinkage and, to a corresponding extent, the ability to accept longitudinal compressive shrinkage. In this respect, the equipment typically employed for laminating or bonding of fabrics inherently imparts a substantial longitudinal tension thereto.

The backing fabric, in accordance with the invention, is a substantially more specific construction and composition. In this respect, the backing fabric is constructed of a mechanically settable thermoplastic material, most advantageously nylon or acetate. Further, the construction of the backing material is a jersey tricot or similar construction, in which one surface is formed substantially by a series of longitudinally disposed rows of loops and the opposite surface is formed by a series of diagonally disposed connecting elements. Thus, the backing material is of a distinctly two-sided construction, presenting two rather distinct surface layers.

Figure 11:
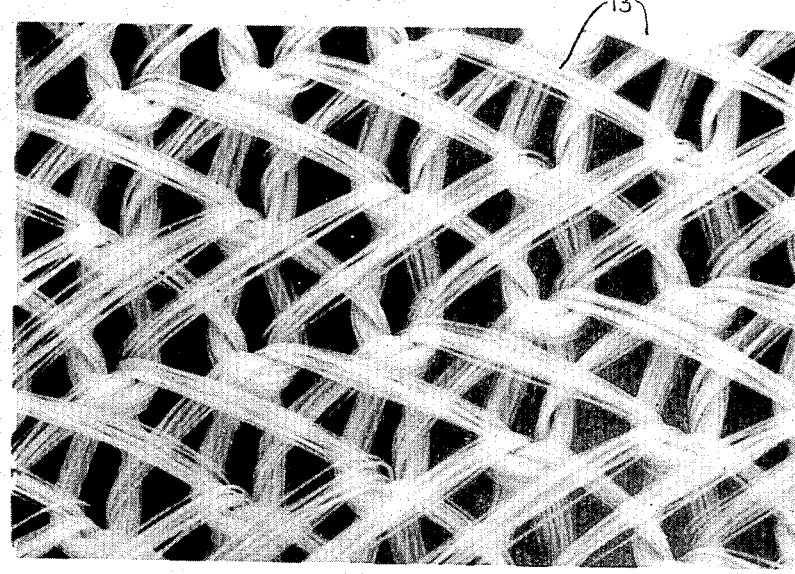
FIGS. 11 and 12 are greatly enlarged photographic views showing the concealed and exposed sides, respectively, of an advantageous form of tricot backing fabric utilized in the process and product of the invention.
Figure 12:
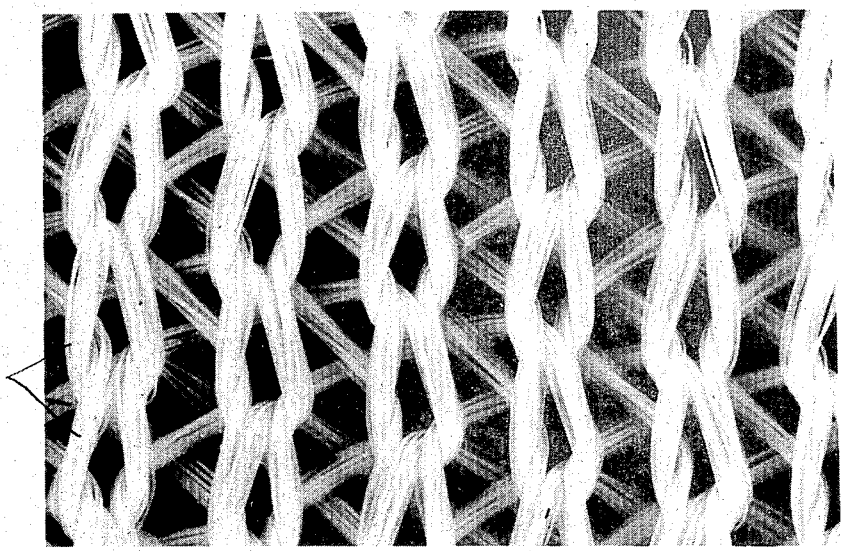

Referring specifically to FIGS. 11 and 12, there are shown photographic reproductions of the opposite surfaces of a typical jersey tricot backing fabric of a type ideally suited for the practice of the invention. The illustration is a magnified reproduction of a nylon jersey tricot fabric, 28 gauge, 2 bar, 40 denier. Most desirably, the tricot fabric is constructed of multifilament yarns, with the individual filaments of the yarn being of continuous or substantially continuous form.

In the representations of FIGS. 11 and 12, FIG. 12 illustrates the tricot fabric surface layer which is comprised essentially of a side-by-side series of longitudinally disposed rows 10 of connected loops 11. In effect, the longitudinal rows 10 comprise chains of the individual loops 11. The rows of loops may be considered as forming, in effect, a first surface plane of the tricot backing fabric, and for convenience, this surface, shown in FIG. 12, may be referred to as the face of the fabric.

In FIG. 11, there is a magnified reproduction of the opposite or back surface of the tricot fabric, which is comprised essentially of diagonally disposed connecting elements 13. Typically, these connecting elements are disposed at a large angle (e.g., as much as 45° or 60°) to the longitudinal axis of the fabric, which is vertical in the illustration. The diagonal connecting elements 13 form, in effect, a second surface plane of the tricot backing fabric, as will be evident in FIG. 11.

Although the loops 11 and diagonal connecting elements 13 form rather separate and distinct surface planes of the tricot fabric, it will, of course, be understood that the two surface planes are structurally integrated. That is, a pair of yarns, in the construction illustrated in FIGS. 11 and 12, will first form a loop on the face of the fabric and then will diverge and pass diagonally across the back of the fabric, forming diagonal connecting elements, then form other loops, in a different longitudinal chain thereof on the face of the fabric, and again pass diagonally across the back of the fabric as diagonal connecting elements, and so on.

In accordance with one aspect of the invention, special advantages are derived if the backing fabric is oriented, in the composite fabric structure, with the loop or face side of the tricot exposed, and the back of the tricot being bonded to the concealed surface of the shell fabric. With the tricot backing fabric thusly oriented, mechanical compressive shrinkage of the composite fabric, without pleating or otherwise detrimentally affecting the appearance of the composite, may be more readily achieved, as will be subsequently explained.

The third principal component of the composite fabric is the means for bonding the shell and backing fabrics together. Currently, the two widely accepted bonding media utilized in the manufacture of composite fabrics are bonding resins and expanded foam lamina which will be referred to herein as adhesive bonding techniques.

Frequently, resin bonded composite fabrics utilize a so-called delayed-cure bonding resin, which facilitates handling and processing of the fabric while the resin remains in its "green" or uncured state. The delayed cure resins typically may be of the heat or time cured type. In the case of heat cured resins, a relatively high temperature heating operation is required to effect the necessary polymerization or other reaction to cure the resin. This operation may be carried out at a time convenient to the requirements of the other processing operations and may, if desired, be performed subsequent to mechanical compressive shrinkage of the composite fabric. Another advantageous type of delayed cure bonding resin is a time cure resin, which cures very slowly, after application, but does not require external heat. Where the lamination and subsequent processing operations are fairly well integrated, the time cure resins may be used to advantage where it is desired to perform additional processing operations, such as compressive shrinkage, while the resin remains uncured.

Where the bonding means comprises intermediate lamina, it is conventional to utilize continuous web lengths of thin foam materials. Typically, the foam may be an expanded polyurethane foam which, in its initial web form, may be 1/16 in. or less in thickness and of a width dimension corresponding to that of the fabric webs to be united. Conventionally, the fabric webs are flame laminated with the intermediate layer of foam. That is, the foam is momentarily exposed to a high temperature flame and immediately thereafter contacted with a surface of the fabric. The flame melts the exposed surface of the foam, enabling it to form a thermoplastic bond with the fabric surface against which it is contacted. The flame lamination process can be so conducted that the foam bonding web is substantially collapsed and almost ceases to exist in the form of a foam material. In typical practice, however, it usually is preferred that a portion of the foam bonding web remain in its film-like original form, although at a reduced thickness dimension, to impart added bulk to the composite fabric. Experience indicates that the bond of the foam to the shell and backing fabrics continues to improve for about 24 hours after the bonding operation.

In accordance with the invention, a processed composite fabric, characterized by stabilization against shrinkage and having other advantageous features, is derived first by appropriate construction of the composite and, second, by effecting a mechanical compressive shrinkage of the composite in the manner herein described . As mentioned above, composite fabric may comprise a wide variety of shell fabrics, selected to suit the desires of the designer and manufacturer and possessing, insofar as the present invention is concerned, a suitably low degree of lengthwise shrinkage upon typical home laundering and drying. The selected fabric is bonded, by techniques such as described above, to a specific type of backing fabric which imparts, to the composite fabric, an optimum receptivity to mechanical compressive shrinkage. The specific backing fabric construction suitable for the invention utilizes a mechanically settable thermoplastic material, most advantageously multi-filament continuous yarns of acetate or nylon, knitted to have fairly distinct front and back surfaces. Most advantageously, the backing fabric is a nylon or acetate tricot, the outer or front surface of which comprises longitudinal rows of loops, and the inner or back surface of which comprises diagonally disposed connecting elements. Although the bonding of the shell and backing fabrics is necessarily discontinuous, in that the structures of the fabrics inherently do not accommodate continuous mutual contacting of the yarns the bond between the fabrics is substantially a full area bond, in that there is no provision for substantial areas of the contacting fabrics which are not bonded together. Ideally, the fabrics are joined with a sufficient amount of adhesive material to maintain the bonded integrity of the composite fabric throughout processing and use, while avoiding, insofar as possible, imparting excessive stiffness bulk and weight to the fabric.

In accordance with the invention, the above described composite material is subjected to a mechanical compressive shrinkage operation in accordance with predetermined process parameters, both to reduce the residual shrinkage of the composite fabric to a commercially acceptable level and to effect a significant improvement in the hand and other characteristics of the finished composite fabric. The mechanical compressive shrinkage operation most advantageously is of an assymetrical nature, in that the opposed surfaces of the composite fabric are acted upon differentially in the course of the treatment. A most advantageous apparatus for this purpose, shown in FIG. 1, comprises a so-called Walton compactor of the type described and claimed in U.S. Pats. Nos. 2,765,513 and 2,765,514, granted to Richard R. Walton. Such a compactor comprises controllably driven feeding and retarding rollers 15, 16 arranged to form a roller nip 17 and operating in conjunction with an indentor element 18. The retarding roller 16 advantageously is formed of metal and has a surface treated to provide relatively high friction contact with fabric passing through the roller nip 17. The feeding roller 15 desirably has an outer surface formed of rubber or other resilient material.

In the illustrated arrangement, the indentor element or blade 18 is mounted on a shoe 19 which conforms somewhat with a portion of the surface of a feeding roller 15. The shoe 19 is adjustably disposed relative to the rollers 15, 16, so that (a) the projecting extremity or tip 18a of the indentor blade may be brought into pressure engagement with the surface of the feeding roller, in order to lightly pinch a fabric passing between the indentor blade and the feeding roller, and (b) in order to effect controlled adjustment of the space between the tip of the indentor blade and the roller nip 18. This space, designated by the reference numeral 20 in FIG. 2, is sometimes referred to herein as the compressive shrinking zone. In accordance with the teachings of the before-mentioned Walton patents, the length of the compressive shrinkage zone is very short, usually around ¼ in. or less, and more typically, on the order of around 0.200 inch.

The composite fabric, identified by the numeral 21 in FIGS. 1 and 2, is advanced from a supply (not shown) over one or more guide rollers 22, 23, and into tangent contact with the feeding roller 15. The guide rollers 22, 23 may be driven or not, but desirably are arranged so as to avoid the application of any significant back tension upon the composite fabric, as it advances toward the compressive shrinking zone.

The last guide roller 23 is so disposed, relative to the feeding roller 15, as to cause the fabric to contact the feeding roller a substantial distance from the roller nip, and the fabric is carried along the feeding roller surface up to and beyond the tip 18a of the indentor blade. The fabric is pressed lightly against the feeding roller surface by the indentor blade 18, so as to afford positive feeding of the composite fabric at the peripheral speed of the feeding roller 15, at least up to the point of emergence of the fabric beyond the tip of the blade.

Desirably, as the composite fabric passes between the feeding roller 15 and the shoe 19, preconditioning steam is ejected onto the fabric from a slot 24 extending across the face of the supporting shoe.

After the fabric emerges from under the indentor blade, it travels through the short compressive shrinking zone 20, and then into the roller nip 17 wherein the fabric is engaged with pressure between the feeding and retarding rollers 15, 16. The retarding roller 16, in accordance with heretofore known principles, is driven to have a perihperal speed less by a predetermined amount than the peripheral speed of the feeding roller 15. By design, the retarding roller 16 has a greater frictional grip upon the fabric than the feeding roller 15, at the roller nip, so that the fabric emerges from the roller nip substantially at the peripheral speed of the retarding roller. The fabric thus is caused to advance over the feeding roller and up to the entry end of the compressive shrinking zone (defined by the tip 18a of the indentor blade) at the peripheral speed of the feeding roller. In the course of its traverse through the compressive shrinking zone (the discharge end of which is defined by the roller nip 17), the fabric is decelerated to a speed approaching the peripheral speed of the retarding roller 16. Thus, within the short compressive shrinking zone, the fabric is longitudinally compacted and, when the operation is properly carried out, caused to emerge from the discharge side of the roller nip as a fabric of reduced length but substantially unchanged width, free of pleats and other undesirable distortions.

In the process of the invention, the composite fabric 21 is so oriented upstream of the compressive shrinking station that the shell fabric side of the composite is brought into contact with the surface of the feeding roller 15. The shell fabric is designated by the reference numeral 25 in FIG. 2 and is illustrated therein as a woven fabric of conventional type. The backing fabric, designated by the numeral 26 in FIG. 2, is oriented to be exposed directly to the steam opening 24 in the supporting shoe 19, and is also oriented to be contacted by the indentor blade tip 18a and by the high friction surface of the retarding roller 16.

As reflected in FIGS. 2 and 3, the composite fabric 21 is advanced without significant geometrical change up to the discharge tip 18a of the indentor blade. Thereafter, in the short compressive shrinkage zone 20, the fabric is compressivly shortened, according to the relationship between the feeding speed (of the roller 15) and the retarding speed (of the retarding roller 16). Typically, this is accompanied by an increase in the thickness of the fabric within the compressive shrinking zone. The compressively shortened fabric then passes through the roller nip 17 and is released on the discharge side thereof. The compressively shrunk fabric, upon its release from the roller nip, will undergo an extension in length, but not to its original length, so that the treated product is controllably shorter than the fabric derived from the original supply.

In accordance with one aspect of the invention, the backing fabric 26 is so oriented in the composite fabric 21 that the longitudinal rows of knitted loops are exposed for contact by the retarding roller 16. Where this condition is observed in the described compacting equipment, the individual knitted loops are caused to be upset principally in the thickness direction of the fabric, as described. This is surprising and unexpected, since experience would suggest that, in the mechanical compressive shrinkage of a knitted material in a compacting apparatus of the type described, the individual knitted loops would accept a larger degree of compressive shrinkage by reason of widthwise enlargement of the loops. While the invention is not limited in all aspects to the concept of upsetting of the knitted loops in the thickness direction of the fabric, it is presently believed that such thickness-wise upsetting of the knitted loops is particularly advantageous, not only to the processing operation, but also to the product ultimately derived therefrom.

As reflected in FIG. 2, the knitted loops 11 of the incoming composite fabric generally lay relatively flat, substantially in a single plane, being bent slightly in the thickness direction, sufficient to accommodate the overlapping of yarns where one loop joins another. In passing through the compressive shrinking zone 20, the individual knitted loops of the backing fabric are upset sharply in the thickness direction, as a result of the substantial differential of the speed at which the composite fabric is being conveyed by the grip upon its exposed shell fabric surface and the speed to which it is being retarded by the grip on its exposed backing fabric surface. The fabric, with the sharply upset surface loops, now designated 11a in FIG. 2, then passes into the tightest part of the roller nip 17. Typically, this is set to have a thickness considerably less than the thickness of the unprocessed fabric (e.g., one-half or less), and therefore forms a severely constricted space in relation to the compacted fabric, which is of even greater thickness. The passage of the fabric through the constricted roller nip effects a mechanical working of the yarns of the fabric prior to its release on the discharge side.

A number of significant parameters govern the performance of the compressive shrinking operation on the composite fabric, including the proper initial orientation of the fabric relative to the feeding and retarding rollers, as above described. Without implying any particular order of importance of the respective parameters, a first consideration is the establishment of a compressive shrinking zone of appropriate length, in relation to the amount of compressive shrinkage effort to be put into the fabric so as to confine the thickness-wise upsetting of the backing fabric to cycles or waves corresponding to the length of the loop structure. Thus, as will be evident in FIGS. 2 and 10, the cross-sectional configuration of the compressively shrunk fabric reflects a saw tooth-type shape of the individual knitted loops after compacting. In general, each loop is similar to every other loop, so that corresponding portions of the upset loops, in general, lie in the same plane. Moreover, the thickness-wise upsetting of the backing fabric does not extend in a wave form greater than one loop in length, which could impart a noticeable and undesirable rippled appearance to the fabric.

A further significant parametric consideration is the extent of compacting effort to be imparted to the composite fabric. The maximum extent to which the composite fabric should be compacted is that at which the thickness-wise upset knitted loops, forming the outer surface of the backing fabric, still form an obtuse included angle in their substantially saw tooth upset form. This is reflected in FIG. 4, where the substantially saw tooth loop form of a compressively shrunk composite fabric according to the invention comprises an elongated section 30 (typically forming the open end of the knitted loop) lying generally in the principal surface plane of the fabric, and a sharply inturned shorter leg 3 (typically forming the closed end of the loop). As long as these two principal legs 30, 31 of the compressively shrunk loop form have an obtuse included angle "A" at the intersection of their principal axes, the total effective compressive shrinking effort is within the upper limit contemplated by the invention. When this upper limit is exceeded, as reflected by the presence of acute included angles in the saw tooth forms of the compressively shrunk loop structure, the fabric will have an undesirable pleated appearance.

As a minimum limit of effective compressive shrinkage effort contemplated by the invention, in its commercially most practicable form, the structure of the backing fabric should be subjected to forces of sufficiently high intensity, within the compressive shrinking zone, to irreversibly set the thermoplastic elements of the backing fabric material substantially through self-generation of the necessary heat of deformation, as a result of such thermoplastic elements. It is contemplated, of course, that the composite fabric entering the compressive shrinking zone will first be subjected to the action of steam, and it is also contemplated that the retarding roller 16 will be heated internally, by steam or other means, to a temperature sufficient to prevent condensation of the ambient steam upon the surface of the retarding roller (the feeding roller 15 usually being chilled, however). To this extent, at least, some external heat will be present. However, the temperature levels to which the material is exposed from these sources is insufficient to effect setting of a material such as acetate or nylon, which would be a suitable material for constructing a usable backing fabric, and the additional required energy advantageously is developed by reason of the intensity of the mechanical action upon the fabric.

Consistent with the parameters above described, the effective compressive shrinkage of a typical composite fabric, constructed in the manner herein described, may be effected with a Walton-type compactor as herein described, utilizing a roll ratio (so-called) of from about 60 percent to about 80 percent. The term "roll ratio" as used herein means the ratio of the surface speed of the retarding roller 16 to the surface speed of the feeding roller 15. The "roll ratio" is a measure of the compacting effort imparted to the fabric (assuming the machine to be set to be free of uncontrolled slippages). It should be understood, of course, that a large measure of the imparted compacting effort is released when the fabric emerges from the discharge side of the roller nip 17. Typically, about 75 percent of the imparted compacting effort is thus released.

Referring again to FIG. 1, the system of the invention includes a dryer apparatus, designated generally by the reference numeral 35, which is disposed immediately adjacent the discharge side of the compressive shrinking apparatus. The dryer 35 is a so-called Palmer dryer, which includes a large, heated dryer drum 36, which is driven by suitable means (not shown) at a controlled speed in relation to the speed of the retarding roller 16. A belt 37 embraces most of the circumference of the dryer drum 36, except for a small portion generally adjacent to and facing the discharge side of the roller nip 17. In the illustrated arrangement, the dryer drum 35 rotates in a clockwise direction and the belt 37, in approaching the dryer drum, travels to a point near the discharge side of the roller nip 17 around a pair of guide rollers 38, 39, and thence toward the surface of the dryer drum. Compressively shrunk composite fabric 21a passes directly onto the surface of the belt 37 and is conveyed thereby into direct contact with the surface of the heated dryer drum 36. In the arrangement specifically shown in FIG. 1, the clockwise rotation of the dryer drum and the movement of the belt 37 are such as to carry the exposed surface of the shell fabric into contact with the surface of the dryer drum, and this configuration is desired for most operations. However, it will be understood that the operation of the dryer could be reversed in rotational direction, where appropriate, if it were desired to maintain the shell fabric out of contact with the dryer drum.

As the compressively shrunk composite fabric enters the Palmer dryer 35, it may contain as much as 10 percent moisture. The belt 37 is sufficiently porous to permit large amounts of this moisture to be evaporated off as the treated fabric passes around the surface of the dryer drum, and residual amounts of excess moisture quickly flash off of the fabric as it emerges from the discharge side of the Palmer dryer.

Experience indicates that a composite fabric, of the general construction herein indicated and of a quality to be marketed at moderate price levels, when laminated or bonded in accordance with conventional commercial techniques, may be expected to have a residual shrinkage, when subjected to normal washing and dry cleaning, of as much as 15 percent. At the present time, a 3 percent residual shrinkage (after five washes) of the composite material is deemed to be an acceptable level of shrinkage stabilization for most purposes. The techniques of the invention enable shrinkage stabilization to be easily maintained at the 3 percent level and, indeed, the 3 percent level of stabilization may be significantly improved upon as may be required or justified by the marketing requirements of the manufacturer. Most present commercial requirements are satisfied by composite fabrics of the type herein described which have been processed to a retained compressive shrinkage of 7–10 percent, although significantly greater retained compressive shrinkages may be achieved without detrimentally affecting the fabric through pleating or otherwise.

In the photographic reproductions of FIGS. 5–10, there is illustrated a composite fabric constructed in accordance with the requirements of the invention and compressively shrunk in accordance with the process of the invention to achieve a shrink-stabilized composite fabric. To facilitate visual comparison of the composite fabric of FIGS. 5–10 before and after treatment, the fabric was compressively shrunk to a retained shrinkage of 20 percent. This is substantially greater than ordinarily is required for commercially acceptable shrinkage stabilization under present standards, but is still within the significant parameters described above for the fabric in question. The illustrated fabric is an acrylic tricot shell fabric adhesively bonded to an acetate tricot backing fabric. A comparison of FIGS. 5 and 6, which shows the longitudinal rows of loops of the tricot backing fabric, before and after compressive shrinkage, clearly reflects the thickness-wise upsetting of the knitted loops. A comparison of these two photographs also reflects the multi-filament structure of the yarns of the backing fabric and the fact that the compressive shrinkage operation imparts an attractive degree of texturization to the multi-filament yarns.

Figure 5:
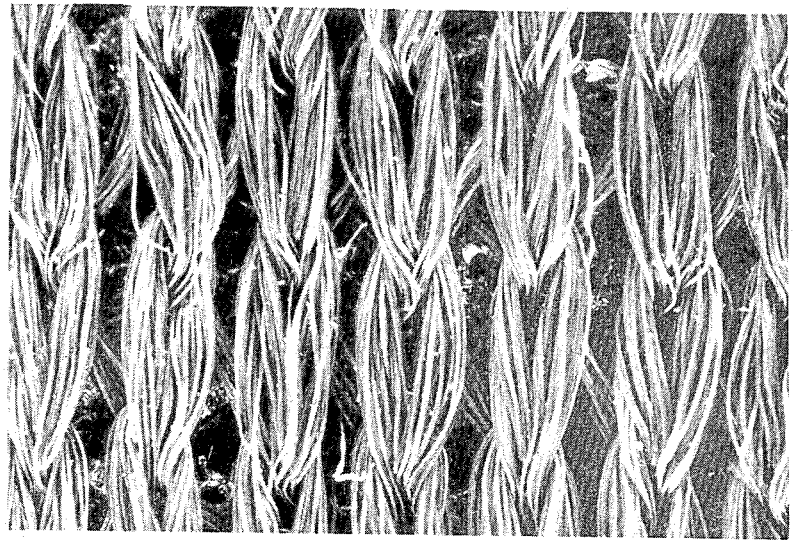
FIGS. 5 and 6 are greatly enlarged photographic reproductions of the exposed or loop surface of the tricot backing fabric of a composite fabric, before and after processing in accordance with the invention, illustrating the manner in which the loop structure of the backing fabric is altered by such processing.
Figure 6:
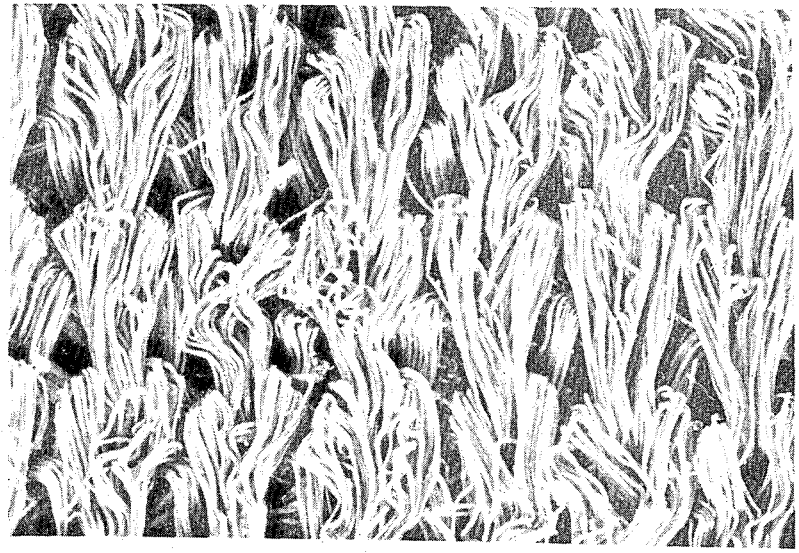
Figure 7:
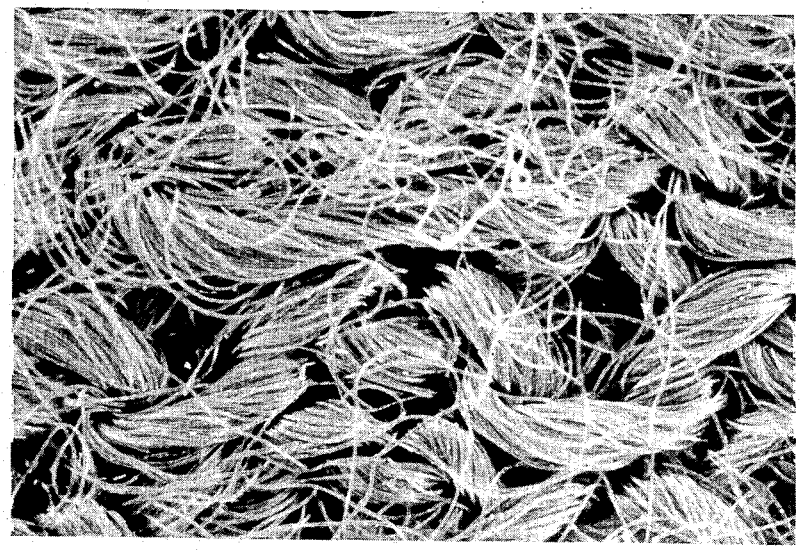
FIGS. 7 and 8 are greatly enlarged photographic reproductions of exposed surface portions of the shell fabric of the same composite fabric illustrated in FIGS. 5 and 6, taken respectively before and after processing in accordance with the invention, and illustrating the change in surface appearance of the shell fabric as a result of processing in accordance with the invention.
Figure 8:
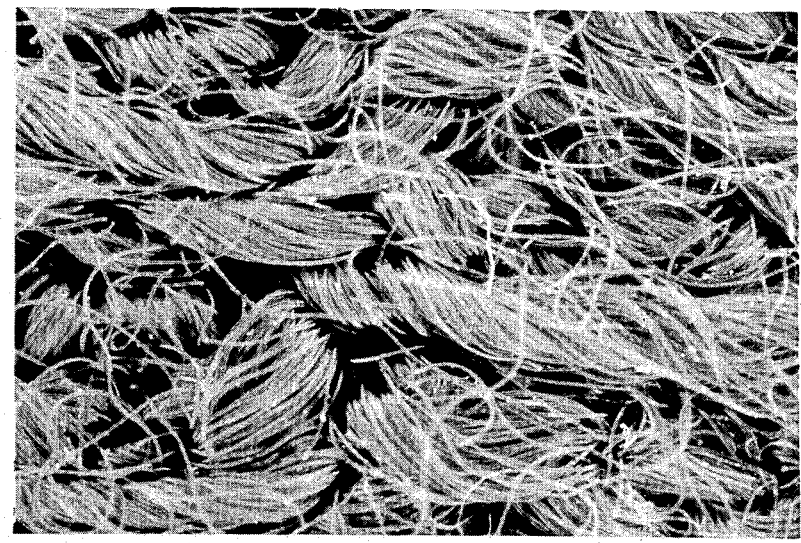

FIGS. 7 and 8 respectively illustrate the exposed surface of the face or shell fabric, before and after compressive shrinkage treatment. It will be observed by comparison of the last mentioned FIGS. that there is a much less dramatic change in the appearance of the fabric surface on the shell fabric than on the backing fabric shown in FIGS. 5 and 6. The fiber structure of the compressively shrunk fabric appears to have loosened somewhat and the individual yarns have been pushed more closely together, but otherwise, the appearance of the fabric is very similar to the original.

One particularly important advantage derived from the pushing together of the yarns of the shell fabric, as reflected in the representation of FIG. 8, is an increased ability to conceal the bonding or laminating agent. Particularly where the shell and backing fabrics are laminated by an intermediate layer of foam, concealment of the intermediate layer is a potential problem. It is not always possible to exactly match the color of the foam with that of the shell fabric, in which case the intermediate material may be visible through the shell fabric to the acute observer. The simultaneous loosening of the fiber structure and closing up of the yarns, resulting from the process of the invention and as reflected in FIG. 8, substantially reduces the visibility of the intermediate material and, to that extent, results in an additional improvement in product quality.

Figure 9:
FIGS. 9 and 10 are greatly enlarged longitudinal cross-sectional views of the fabric illustrated in FIGS. 5–8, illustrating the cross-sectional form of the fabric respectively before and after processing in accordance with the invention and illustrating the generally saw-tooth configuration of the individual loops of the backing fabric after processing.
Figure 10:

FIGS. 9 and 10 respectively illustrate the cross-sectional configuration of the fabric of FIGS. 5–8, before and after compressive shrinkage. In FIG. 9, the cross section of the fabric is shown prior to treatment and it can readily be observed that the backing fabric, appearing as the top layer, is of very flat form, with minimum deviation of the loop structure in the thickness direction. In the illustration of FIG. 10, the backing fabric, again appearing as the top layer, is indicated to have a substantial thickness dimension. Each of the individual knitted loops is sharply upset in the thickness direction and has a regular saw tooth form. The saw tooth wave form, it will be seen, is complete within the confines of each individual knitted loop, so that corresponding portions of successive loops lie substantially in a single plane. Likewise, it will be observed in FIG. 10, that the included angle of the saw tooth loop configuration is approaching the above 90° parametric limit herein specified.

A comparison of the cross-sectional representation of the shell fabric in FIGS. 9 and 10 reflects, as does a comparison of FIGS. 7 and 8, that the change in appearance of the shell fabric, as a result of 20 percent retained compressive shrinkage is significantly less than the change in appearance of the backing fabric.

Although it is not known to be essential, it is considered advantageous to carry out compressive shrinkage treatment of the composite fabric either on an in-line basis with the bonding or lamination operations, or within a relatively short time thereafter. In most cases, the bond between the shell and backing fabrics continues to cure and improve for approximately 24 hours after joining of the fabrics, whether it be by adhesive bonding or flame lamination, and certain advantages may be derived from processing of the composite fabric during this curing period.

The process of the invention, by effecting mechanical compressive shrinkage of composite fabrics through the assymetrical action of feeding and retarding means acting on the shell and backing fabric components respectively, provides an effective production basis for the shrinkage stabilization of composite fabrics. By operating within the significant parameters established by the invention, composite fabrics utilizing shell fabrics of various types, styles, weights, constructions, materials, etc., may be shrink-stabilized to commercially satisfactory levels on a production basis. A principal one of the significant parameters is, of course, the utilization of a tricot backing fabric, formed of a mechanically settable thermoplastic material and oriented with its longitudinal rows of loops forming an outer surface of the composite fabric. In the assymetrical action of the compressive shrinkage operation, feeding and retarding action are imparted principally to the shell and backing fabrics respectively, in such a manner as to effect thickness-wise upsetting and self-generation of the necessary heat of deformation of the knitted loops of the tricot backing material. Within these and the other significant parameters mentioned, the precise production conditions for the shrink stabilization of a specific composite fabric may be readily established.

Although it is not presently known to be absolutely critical, it has been determined to be most particularly advantageous to utilize in the compressive shrinkage of composite fabrics in accordance with the invention, the method and apparatus of the Richard R. Walton U.S. Pats. No. 2,765,513 and No. 2,765,514. It is also believed to be particularly advantageous, when employing the method and apparatus of the Walton patents, to utilize a Palmer-type dryer in close coupled association therewith.

An important secondary advantage to be derived from the processing of composite fabrics in accordance with the invention, resides in the improved hand and feel of the fabric after such processing. In this respect, the utilization of bonding adhesives and laminating intermediates appears to impart to the composite a degree of stiffness or boardiness which, while not overly objectionable for some applications, is rather undesirable where the fabric is to be utilized in the manufacture of personal garments. It appears that the rather intense mechanical working of the composite fabric, when processed in accordance with the invention, significantly improves the flexibility and hand of the fabric without, at the same time, destroying the bond between the two principal fabric components. Very possibly, this improved flexiblity and hand is a result of imparting to the yarns of the fabric structure an increase in the proportion of yarn components oriented in a thickness direction and thereby providing significantly greater numbers of "hinges" about which portions of the fabric may flex in a random manner. It should be understood, of course, that upsetting of the backing fabric loops in a thickness direction, does not necessarily result in increased thickness in the finished fabric, even though the fabric may indeed increase in thickness within the compressive shrinkage zone. This is because the fabric is subjected to concentrated rolling pressure, as it is discharged from the compressive shrinkage zone, and it is subjected to further pressure in the thickness direction as it is processed in the Palmer dryer. Thus, the finished product may actually have a lesser thickness than the unprocessed fabric, notwithstanding the fact that the fabric has been compressively shrunk in the lengthwise direction.

In a typical case, the amount of compressive shrinkage imparted to the composite fabric, when processed according to the invention, in conjunction with the substantially permanent deformation of the yarns resulting from such processing, may impart to the fabric some degree of elastic restorability. This is desirable for many end uses of the composite fabric.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

What is claimed is:

1. The method of forming a shrink-stabilized composite fabric, which comprises
   a. adhesively bonding together in substantially full area contact a shell fabric and a backing fabric to form a composite fabric,
   b. at least said backing fabric being formed of a knitted tricot fabric,
   c. advancing the composite fabric into a comprehensive shrinkage zone primarily by maintaining driving contact with the exposed surface of the shell fabric,
   d. retarding the composite fabric at the discharge side of the compressive shrinkage zone primarily by maintaining retarding contact with the exposed surface of the backing fabric, and
   e. longitudinally compressively shrinking the composite fabric in said zone by causing said fabric to decelerate and compress in said zone.

2. The method of claim 1, further characterized by
   a. imparting steam to the composite fabric immediately prior to the compressive shrinkage thereof, and
   b. drying said composite fabric immediately after compressive shrinkage thereof by confining one side of the composite fabric against a heated moving surface while applying pressure in the thickness direction of the composite fabric.

3. The method of claim 2, further characterized by
   a. the exposed surface of the shell fabric being held against said heated surface during drying.

4. The method of claim 1, further characterized by
   a. the shell fabric being contacted for advancement of said composite fabric by a first moving surface having a predetermined surface speed in an advancing direction, and
   b. the backing fabric being contacted for retardation of the composite fabric by a second moving surface having a surface speed in said advancing direction of from about 60 percent to about 80 percent of the speed of the first surface.

5. The method of claim 4, further characterized by
   a. the composite fabric being resiliently supported by said first moving surface during advancement of the composite fabric, and
   b. the composite fabric being pressed against said first moving surface at the entry end of said compressive shrinking zone by applying localized, across-the-width pressure to the exposed surface of the backing fabric in the thickness direction of the fabric.

6. The method of forming a shrink-stabilized composite fabric, which comprises
   a. supplying a composite fabric including a shell fabric and a backing fabric after said fabrics have been adhesively bonded to each other in substantially full area contact,
   b. at least the backing fabric being of a mechanically settable thermoplastic material,
   c. mechanically compressively shrinking the composite fabric in a longitudinal direction with sufficient mechanical compacting effort to effect self-generation of heat of deformation in the backing fabric sufficient to set the fabric in a compressively shrunk condition.
   d. said mechanical compressive shrinking operation being effected by relatively advancing the one of said backing or shell fabric toward and into a short compressive shrinkage zone relatively retarding the other of said backing fabric or shell fabric at the end of said zone, and thereby causing the composite fabric to decelerate and compress in said zone.

7. The method of claim 6, further characterized by
   a. the backing fabric comprising a knitted tricot fabric having longitudinal rows of loops on its exposed surface and diagonally disposed connecting elements on its concealed surface bonded to said shell fabric.

8. The method of claim 7, further characterized by
   a. the relative advancement of the shell fabric and relative retardation of the backing fabric being effected by directing the composite fabric through a roller nip and therein applying rolling pressure to the composite fabric, and
   b. the relative retardation of the backing fabric at said roller nip being more effective than the relative advancement of said shell fabric at said roller nip.

9. The method of claim 8, further characterized by
   a. the shell and backing fabrics being bonded by a heat reduceable foam or a heat or time curing bonding resin, and
   b. the tricot backing material being formed of multifilament acetate or nylon.

10. The method of forming a shrink-stabilized composite fabric, which comprises
    a. forming a composite fabric by adhesively bonding a shell fabric and a backing fabric in substantially full area contact,
    b. the backing fabric comprising a tricot fabric knitted of multi-filament yarns, and
    c. mechanically compressively shrinking the composite fabric by means of a two roll compactor acting differentially on the opposite sides of said composite fabric to effect conversion of the multi-filament yarns to textured multi-filament yarns and to effect a semi-permanent reduction in the length of the composite fabric.

11. The method of claim 10, further characterized by
    a. said tricot backing material having longitudinally disposed rows of knitted loops forming its exposed surface,
    b. said composite fabric being compacted lengthwise to an extent sufficient to upset said loops in the thickness direction of the fabric and to convert the loops to sawtooth general cross-sectional configuration, but insufficient to cause the apices of said saw-tooth loop configurations to have acute included angles after completion of the compressive shrinking operation.

12. The method of claim 11, further characterized by
    a. the multi-filament yarns of the tricot backing fabric being of a mechanically settable thermoplastic material, and
    b. the composite fabric being compressively shrunk to a degree to cause a self-generation of heat of deformation sufficient to effect setting of the filament material.

13. The method of claim 10, further characterized by
    a. causing said fabric to have a high moisture content during the compressive shrinkage thereof,
    b. conveying the composite fabric about a heated dryer drum immediately following the compressive shrinking thereof, and c. applying broad area pressure to the composite fabric in the thickness direction while said fabric is being conveyed by said dryer drum.

* * * * *